(12) United States Patent
Park

(10) Patent No.: US 8,787,948 B2
(45) Date of Patent: Jul. 22, 2014

(54) METHOD FOR TRANSMITTING AND RECEIVING A MESSAGE BY A MOBILE TERMINAL

(75) Inventor: Sang-Min Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 558 days.

(21) Appl. No.: 12/849,865

(22) Filed: Aug. 4, 2010

(65) Prior Publication Data

US 2011/0034186 A1   Feb. 10, 2011

(30) Foreign Application Priority Data

Aug. 4, 2009  (KR) .................. 10-2009-0071725

(51) Int. Cl.
*H04W 4/00*  (2009.01)
(52) U.S. Cl.
USPC .............. 455/466; 455/412.2; 455/414.1; 715/751

(58) Field of Classification Search
USPC .......... 455/412.1, 412.2, 414.1, 414.2, 414.3, 455/466; 715/751, 752
See application file for complete search history.

(56) References Cited

U.S. PATENT DOCUMENTS

| 2007/0159927 | A1* | 7/2007 | Brush et al. ..................... 368/29 |
| 2007/0237318 | A1* | 10/2007 | McGary .................... 379/114.15 |
| 2008/0082606 | A1* | 4/2008 | Gupta et al. .................. 709/204 |
| 2008/0294999 | A1* | 11/2008 | Bank et al. ..................... 715/751 |
| 2009/0083106 | A1* | 3/2009 | Bhogal et al. ..................... 705/8 |

* cited by examiner

*Primary Examiner* — Vladimir Magloire
(74) *Attorney, Agent, or Firm* — Cha & Reiter, LLC.

(57) ABSTRACT

A method of transmitting and receiving a message by a mobile terminal, includes: acquiring a template and identifying at least one contact number included in the acquired template; transmitting a message to the at least one contact number and receiving a reply member from the at least one contact number; analyzing the received reply message and updating the template according to the analyzed reply message; and determining if the update template satisfies a predetermined condition; and when the updated template satisfies a predetermined condition, transmitting a result of the updated template to the at least one contact number.

20 Claims, 3 Drawing Sheets

METHOD FOR TRANSMITTING AND RECEIVING A MESSAGE BY A MOBILE TERMINAL

CLAIM OF PRIORITY

This application claims the priority under 35 U.S.C. §119 (a) of an application entitled "Method For Transmitting And Receiving A Message By A Mobile Terminal" filed in the Korean Intellectual Property Office on Aug. 4, 2009 and assigned Serial No. 10-2009-0071725, the contents of which are hereby incorporated by reference.

BACKGROUND OF THE INVENTION

1. Field of the Invention

The present invention relates to a method for transmitting and receiving a message via a mobile terminal, and more particularly to a method for acquiring a template, which a user of a mobile terminal requires, through a wired or wireless communication, and transmitting and receiving a message using the acquired template.

2. Description of the Related Art

In general, a mobile terminal refers to a portable wireless communication terminal, a mobile communication terminal, a Personal Communication Service (PCS) terminal, a Personal Digital Assistant (PDA), smart phone, and a wireless Local Area Network (LAN) terminal, etc. capable of exchanging voice, data, and video image through a wireless communication.

The mobile terminal wirelessly communicate via Internet using the Wireless Application Protocol (WAP). The WAP uses the Wireless Markup Language (WML), which is one of markup languages based on extensible Markup Language (XML) suitable for a wireless communication having a low bandwidth.

The WML defines an application interface, which enables a direct voice communication in the WML service, and by which a user can use a data channel and a voice channel. Such a wireless telephone application interface is referred to as "Wireless Telephony Application Interface (WTAI)". The WTAI allows a user to connect a voice communication to a particular phone number or send an SMS/MMS/Email while using a wireless Internet, thereby enabling a convenient use of the voice and data communication.

Meanwhile, the user can store and use a template (for example, a saved page) using the wireless Internet and can download a necessary template through the wireless Internet. For example, the user may download a template, in which a school report card for reporting grades has been implemented, record a grade in the downloaded template, and then transmit the template to a student through an SMS/MMS/Email.

However, the prior art provides only a simple function of downloading, editing and transmitting a template to a communication counterpart, but does not provide such a function, by which the communication counterpart can update a reply message in the template. That is, the prior art simply provides only the function for transmission of the template in the form of a message, and unable provide a function, by which replies of communication counterparts can be worked into the template and used to update the template for transmission.

SUMMARY OF THE INVENTION

Accordingly, the present invention has been made to solve the above-mentioned problems occurring in the prior art, and the present invention provides a method for transmitting and receiving a message, which can acquire a template through various routes, uses the acquired template in transmitting and receiving a message, and update the template through the transmitted/received message for future use of the template.

In accordance with an aspect of the present invention, a method of transmitting and receiving a message by a mobile terminal includes: acquiring a template and identifying at least one contact number included in the acquired template; transmitting a message to the at least one contact number and receiving a reply member from the at least one contact number; analyzing the received reply message and updating the template according to the outcome of the analyzed reply message; and determining if the update template satisfies a predetermined condition; and when the updated template satisfies the predetermined condition, transmitting a result of the updated template to the at least one contact number.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, exemplary embodiments of the present invention will be described with reference to the accompanying drawings.

Figure 1:
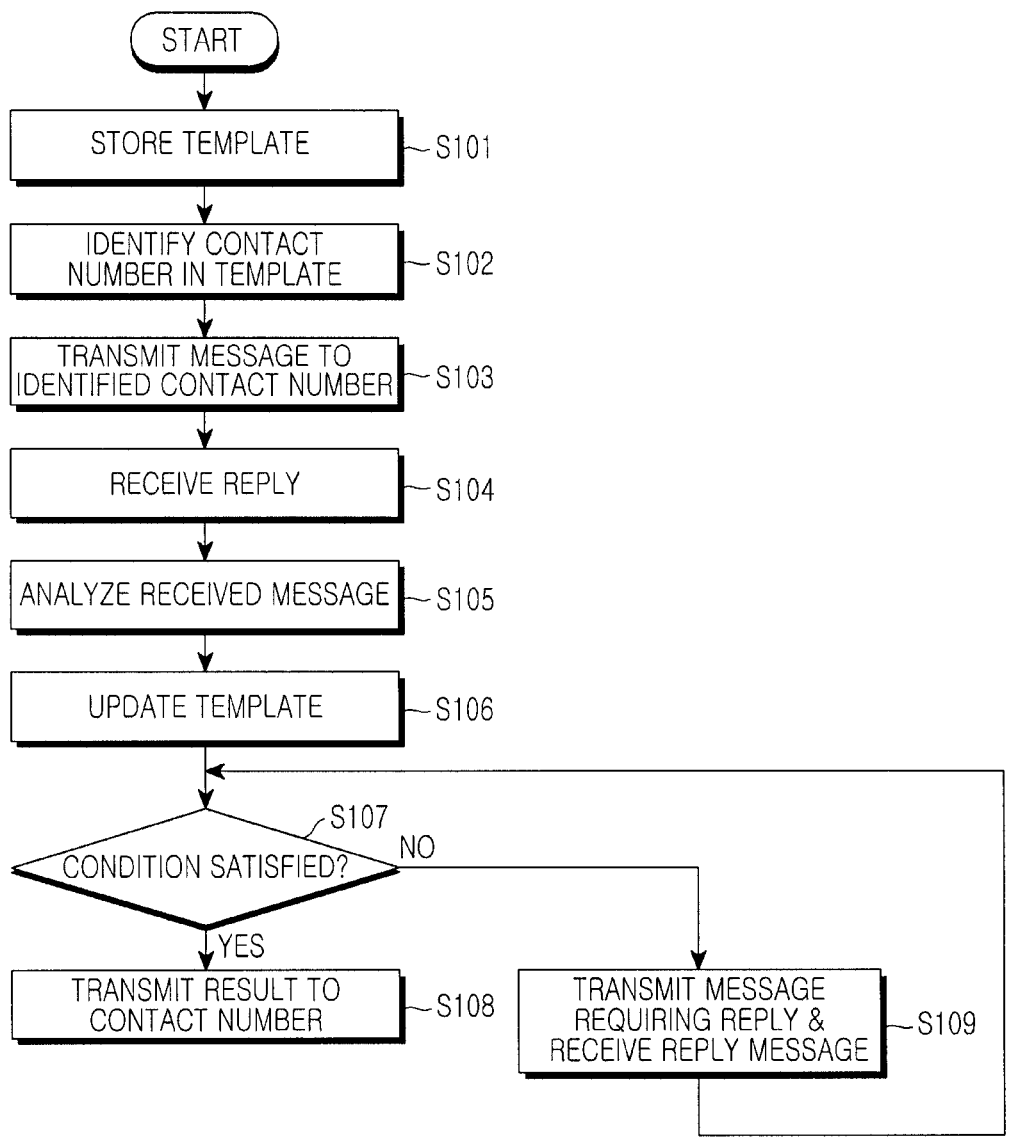
FIG. 1 is a flowchart illustrating a process of transmitting and receiving a message by using a template according to an embodiment of the present invention.

FIG. 1 is a flowchart illustrating a process of transmitting and receiving a message using a template according to an embodiment of the present invention, and FIGS. 2A to 3B illustrate examples of display screens of a mobile terminal for describing the process of transmitting and receiving a message by using a template according to an embodiment of the present invention.

For the purpose of description, a mobile communication terminal capable of voice, data, and video telephony according to the present invention is described in the following examples as a mobile terminal, however the present invention is not limited thereto. While the mobile terminal of the present invention is a terminal capable of voice, data, and video telephony, the invention can be arranged in any type of communication appliance or multimedia appliance, such as mobile communication terminals, mobile phones, personal digital assistants, smart phones, international mobile telecommunications 2000 (IMT 2000) terminals, universal mobile telecommunications system (UMTS) terminals, notebooks, laptops, or personal computers, just to name a few of the many possible arrangements.

Hereinafter, the teachings of the present invention will now be described with reference to FIG. 1 to FIG. 3B.

Referring to FIG. 1, when a user requests a storage of a template, which the users requires, in a mobile terminal, the mobile terminal downloads and stores the template (step S101).

Note that it is possible to provide countless templates according to their uses, and the user can acquire the template through a wireless Internet. Alternatively, the users can make a template according to their needs. That is, the template can be either downloaded and acquired through a wired or wireless communication, or can be customized by a user. Examples of such templates include a template for checking if people will attend a particular meeting and a template for asking if people are for or against a particular issue.

Figure 2A:
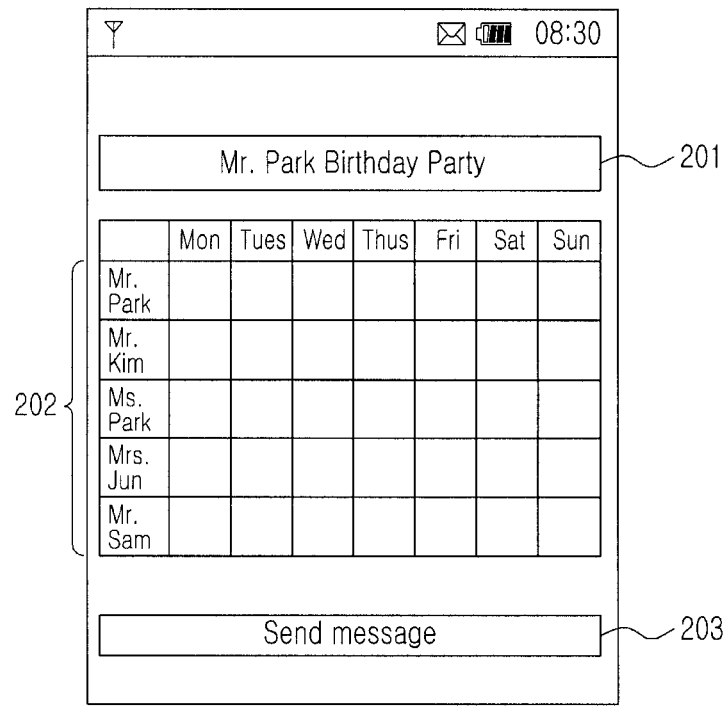
FIGS. 2A to 3B illustrate examples of display screens of a mobile terminal for describing the process of transmitting and receiving a message using a template according to an embodiment of the present invention.

FIG. 2A is a screen of a mobile terminal showing an example of a template, by which each member can select a day of the week at which he or she can attend a birthday party. The example shown in FIG. 2A corresponds to a template intended to identify and collect days of the week from Monday to Saturday, at which the members (Mr. Park, Mr. Kim, Ms. Park, Mrs. Jun, and Mr. Sam) can attend the birthday party for Mr. Park. Such a template can be modified by a user according to an embodiment of the present invention. Especially in FIG. 2A, a user can modify the template title drive amplifier 201, or can add or delete a member 202 using an input device of the mobile phone. The input unit may include a plurality of alphanumeric and function keys for inputting alphanumeric information and for setting various functions. The input unit transmits key signals from the user for setting and controlling the mobile terminal to the control unit of the mobile terminal.

Thereafter, the mobile terminal identifies a contact number of each member who are intended recipient of the downloaded template (step S102), transmits a message to the contact number (step S103), and receives a reply message from each member in response to the transmitted message (step S104).

Figure 2B:
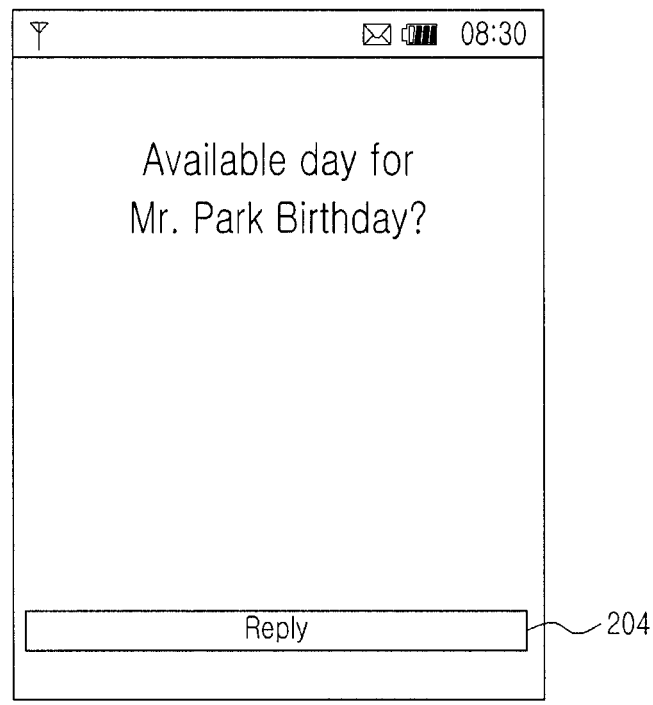

When it is identified that an input of the "send" button 203 of the message has been input by the user, the mobile terminal identifies the contact number of each member 202 and transmits a message as shown in FIG. 2B to each contact number. Through this process, the user can identify the day of the week at which each member can attend the birthday party. Each member 202 can receive a message as shown in FIG. 2B and select the "reply" button in order to make a reply to the question in the received message.

For example, upon receiving the message as shown in FIG. 2B, Mr. Park can write "I'm available on Monday and Friday but unavailable on Tuesday" within the reply message and then send the reply message. Through the same process, the mobile terminal receives reply messages from Mr. Kim, Ms. Park, Mrs. Jun, and Mr. Sam.

At this time, if the message is transmitted in the form of a Short Message Service (SMS) or a Multimedia Message Service (MMS), a call back SMS scheme, in which the received message has a menu enabling a user having received the message to send back the reply message, may be used so that the reply message can be identified as a reply message in response to the message transmitted in step S103. Similarly, the message may be transmitted according to the Wireless Application Protocol (WAP) push scheme, so as to enable a user having received the message to transmit an instant reply message by simply selecting a predetermined button, so that the reply message can be identified as a reply message in response to the message transmitted in step S103. Otherwise, a particular flag may be inserted in the message transmitted in step S130, so as to discriminate the transmitted message from the other messages. Further, particular flags may be inserted in other messages in order to indicate that they are the reply message in response to a particular message.

The message transmitted in step S103 (for example, the message shown in FIG. 2B) may be either a message set to be included in the template, a message manually input by the user, or a message modified by the user from the message set to be included in the template.

Thereafter, the mobile terminal analyzes the received reply message (step S105), and updates the template based on the analyzed reply message (step S106).

Figure 3A:
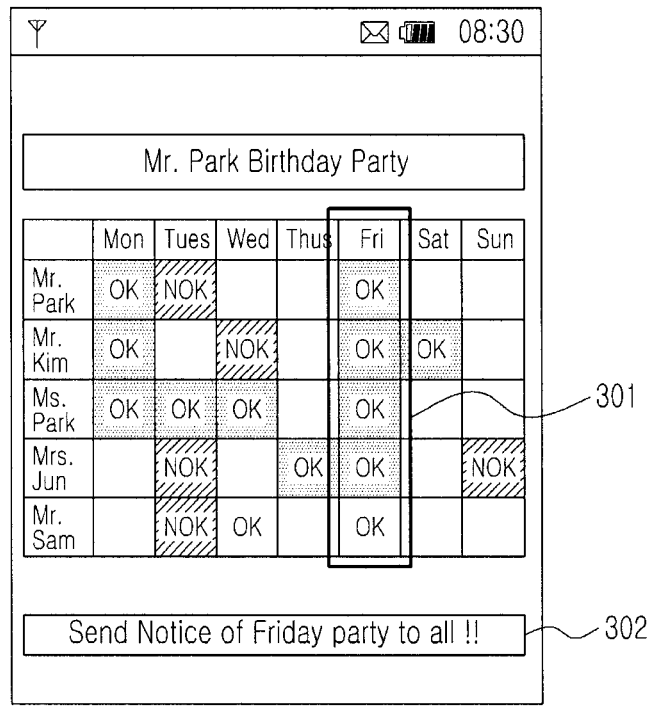

The mobile terminal parses the sentence structure of each reply message received from each member. For example, when the mobile terminal has received a reply message from Mr. Park, reading "available on Monday and Friday and unavailable on Tuesday", the mobile terminal identifies, through the sentence parsing, that Monday and Friday are "OK" and Tuesday is "not-okay (NOK)". In the same manner, through sentence parsing of reply messages from Mr. Kim, Ms. Park, Mrs. Jun, and Mr. Sam, the mobile terminal can identify available days and unavailable days of the week. Thereafter, the mobile terminal updates the template stored in step S101, by using the available days and unavailable days of the week identified from the reply messages of each member. For example, as shown in FIG. 3A, the mobile terminal updates the template by uploading the available days and unavailable days of the week identified from the reply messages of the members to the template.

Thereafter, the mobile terminal determines if the updated template satisfies a predetermined condition (step S107). When the updated template satisfies a predetermined condition, the mobile terminal transmits a result of the determination to the contact number of each member. When the updated template does not satisfy a predetermined condition, the mobile terminal retransmits the message requesting a reply, receives replies, and then determines again if the updated template satisfies a predetermined condition (step S109).

According to an embodiment of the present invention, the predetermined condition may be set to require reception of all reply messages from all members. Alternatively, the predetermined condition may require that all reply messages from all members be received, be parsed, and then be reflected in the update of the template. Further, the predetermined condition may be changed according to the type of the template. For example, when the template is a template requesting a reply message within a predetermined time period, the predetermined condition may be a determination if the predetermined time period has elapsed.

Figure 3B:
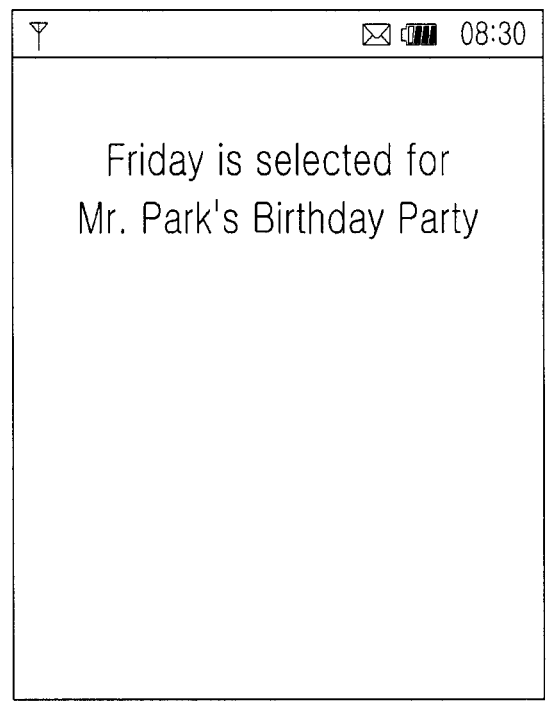

When the predetermined condition requires reception of all reply messages from all members and has been satisfied, the mobile terminal can notify that the day of the week at which all members can attend the party has been determined as Friday 301, as shown in FIG. 3B. This notification may be performed either automatically or through key input 302 by the user. When the predetermined condition requires the reception of all reply messages from all members and has not been satisfied, the mobile terminal may transmit a message requesting a reply message to a member, from which the mobile terminal has not received the reply.

According to a modified embodiment of the present invention, instead of notifying the message (for example, through SMS) shown in FIG. 3B, an image in which the screen as shown in FIG. 3A is captured, may be transmitted, so that the members having transmitted a reply message can identify the screen as shown in FIG. 3A. Alternatively, a template as shown in FIG. 3A may be uploaded to a predetermined server while only a connection link of the uploaded template is transmitted to the members having transmitted the reply message.

As explained in the foregoing, according to the present invention, a mobile terminal can acquire a template proper for a use purpose, transmit and receive through the acquired template, and update the acquired template through the transmitted and received message.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to a certain exemplary embodiment thereof, it will be understood by those skilled in the art that various changes in form and details may be made therein without departing from the spirit and scope of the invention as defined by the appended claims. That is, although the embodiment described above with reference to FIGS. 1 to 3 discusses a case in which the template is a template for identifying the day of the week on which members can attend a birthday party, the present invention is not limited to the described embodiment. Other templates relating to events, reminders, correspondences, follow ups, inquiries, and other notices requiring various types of feedbacks may be applicable according to the teachings of the present invention.

What is claimed is:

1. A method of transmitting and receiving by a mobile terminal, the method comprising:
    receiving a template having an empty data field and identifying at least one contact number intended to receive the received template having the empty data field;
    transmitting the received template, having the empty data field, to the at least one contact number;
    generating and transmitting, by at least one of the contact number, a reply message with data to be entered into the empty data field;
    receiving the reply message with the data from the at least one contact number;
    analyzing the received reply message and updating the received template to fill the empty data field of the received template with the data;
    determining if the updated template satisfies a predetermined condition; and
    if so, transmitting the updated template, having the data field include the data, to the at least one contact number,
    wherein the predetermined condition is satisfied when all respective reply messages from each of the at least one contact number have been received.

2. The method of claim 1, wherein the predetermined condition changes according to a type of the received template.

3. The method of claim 1, wherein the received template transmitted to said at least one contact number has an included message.

4. The method of claim 1, wherein the received template transmitted to said at least one contact number includes a message input by a user or a message modified from a message included in the received template.

5. The method of claim 1, further comprising, when the updated template does not satisfy the predetermined condition, establishing a connection to said at least one contact number and requesting the reply message.

6. The method of claim 1, wherein the received template is associated with a particular event.

7. The method of claim 1, wherein the received template can be modified via an input device of the mobile terminal.

8. The method of claim 1, wherein the reply message is transmitted via a short message service (SMS).

9. The method of claim 1, further comprising:
    transmitting an image corresponding to the updated template to the at least one contact number.

10. The method of claim 1, wherein the received template is uploaded to a predetermined server while only a connection link to the uploaded template is transmitted.

11. A method of transmitting and receiving by a mobile terminal, the method comprising:
    receiving a template having an empty data field and identifying at least one contact number intended to receive the received template having the empty data field;
    transmitting the received template, having the empty data field, to the at least one contact number;
    generating and transmitting, by at least one of the contact number, a reply message with data to be entered into the empty data field;
    receiving the reply message with the data from the at least one contact number;
    analyzing the received reply message and updating the received template to fill the empty data field of the received template with the data;
    determining if the updated template satisfies a predetermined condition; and
    if so, transmitting the updated template, having the data field include the data, to the at least one contact number,
    when the updated template does not satisfy the predetermined condition, establishing a connection to said at least one contact number and requesting the reply message.

12. The method of claim 11, wherein the predetermined condition changes according to a type of the received template.

13. The method of claim 11, wherein the received template transmitted to said at least one contact number has an included message.

14. The method of claim 11, wherein the received template transmitted to said at least one contact number includes a message input by a user or a message modified from a message included in the received template.

15. The method of claim 11, wherein the predetermined condition is satisfied when all respective reply messages from each of the at least one contact number have been received.

16. The method of claim 11, wherein the received template is associated with a particular event.

17. The method of claim 11, wherein the received template can be modified via an input device of the mobile terminal.

18. The method of claim 11, wherein the reply message is transmitted via a short message service (SMS).

19. The method of claim 11, further comprising:
    transmitting an image corresponding to the updated template to the at least one contact number.

20. The method of claim 11, wherein the received template is uploaded to a predetermined server while only a connection link to the uploaded template is transmitted.

* * * * *